Figure 1:
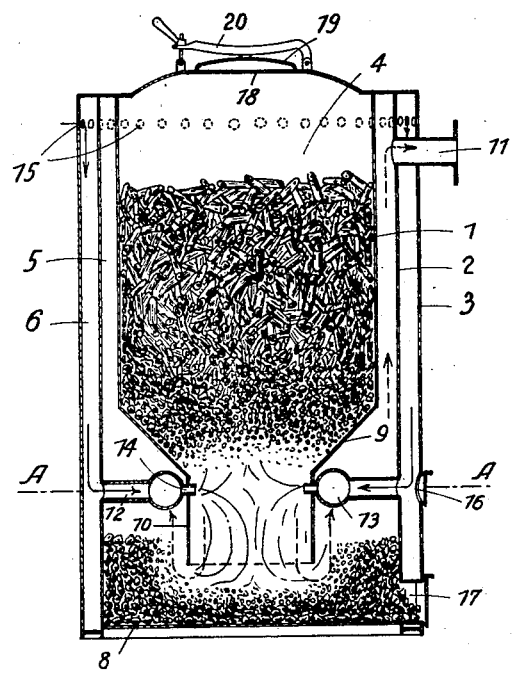

Sept. 1, 1931.  G. IMBERT  1,821,263

GAS PRODUCER

Filed Oct. 15, 1927

Inventor.

Georges Imbert

Patented Sept. 1, 1931

1,821,263

UNITED STATES PATENT OFFICE

GEORGES IMBERT, OF DIEMERINGEN, FRANCE

GAS PRODUCER

Application filed October 15, 1927, Serial No. 226,470, and in Germany October 25, 1926.

This invention relates to a gas producer, particularly for manufacturing producer gas from vegetable fuels such as wood, peat, stalks and the like, i. e., out of fuel which is most widely distributed and which under proper treatment yields gas and other power products of sufficiently high value to replace in a favorable manner the light hydrocarbons which are more or less rare and not easily recovered. Every gas producer is not suitable for this purpose, and experiments made in this direction have shown that technically imperfect gas producers have defects of such a magnitude that the advantages aimed at by their use are almost completely neutralized. This applies particularly to gas producers for use with motor vehicles, since these, as compared with stationary gas producers, must meet a large array of additional requirements. It therefore depends on the construction of the gas producer whether wood and other vegetable fuels can be advantageously used as gas producing substances.

By the gas producer according to the present invention the problem of gas production from vegetable fuels for use with motor vehicles is effectively solved. In this producer the gasification zone is not completely limited in space by a grate or other structural element or by descending fuel and ashes. On the contrary, it extends through spaces which are interconnected in the manner of communicating vessels and which ensure at all times a free delivery of the generated gas. This circumstance, which is of the greatest technical importance, enables the gas producer to be used continually for an unlimited time without the disturbances which are so frequent in the ordinary gas producers and which render the latter unsuitable for use with motor vehicles.

The producer is also characterized by the feature that the outgoing gas and the fresh air required for the combustion, sweep round the fuel shaft in opposite directions so as to subject on the one hand the fuel and on the other hand the air to a preliminary heating which is very favorable to the gasification process. At the same time the producer is effectively ensured from external heat interchange so that loss of heat is almost entirely eliminated. Moreover, owing to the reducing properties of the generated gas and to the manner in which the gas is led off, even those parts of the producer which are exposed to the greatest heat, will not burn out in spite of the complete absence of refractory linings.

All these advantages, to which may be added the small weight and the simple construction of the producer, render the latter, in respect of maintenance and attendance, just as serviceable as a liquid fuel supply for the driving of a motor engine, since the attendance is limited to the mere replenishing of the gas producer with fuel in proportion to the gas consumption. All disturbing and destroying influences being entirely obviated in this gas producer, its advent may be considered as a final solution of the problem of driving the engines of motor vehicles by means of solid instead of liquid fuel.

Figure 2:
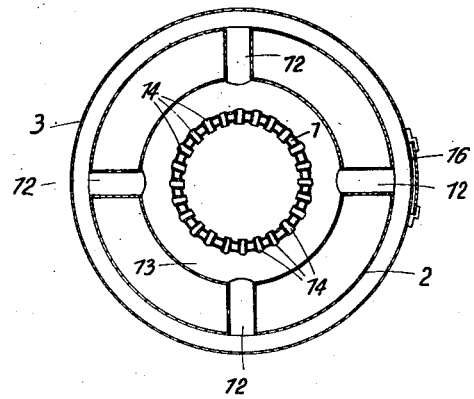

The invention is illustrated in the accompanying drawings in connection with a down draft gas producer, Fig. 1 representing a longitudinal section of the producer, and Fig. 2, a cross-section of the same taken on the line A—A of Fig. 1.

It will be seen that the producer is composed of three concentric shells 1, 2 and 3 made of sheet metal or other suitable material. The inner shell encloses the gas producing chamber 4 which contains vegetable fuel, and the two outer shells enclose each an annular space 5 and 6 respectively. While the outer shells run parallel with each other from the cover 7 right to the bottom 8; they are only parallel with the inner shell for some distance, said inner shell being, at some distance from the bottom, contracted into a frusto-conical section or funnel 9 fitted with a straight outlet conduit or neck section 10. This conduit does not reach right down to the bottom 8. The inner annular space 5, which serves for the discharge of the gases, communicates for the purpose of such discharge with a pipe 11 which passes through the space 6 near the top of the structure. The outer annular space communicates through pipes 12 with a hollow distributing ring or pipe 13 which encircles the upper part of the conduit 10, i. e., the heating zone, and which in its turn communicates with said conduit through a suitable number of radial pipes or nozzles 14. There is also, in the upper part of the outer shell, a plurality of air inlets 15 which are uniformly spaced about the shell. Moreover, the two outer shells have registering apertures 16 and 17 which are normally closed by hinged or like doors and which serve for the starting and cleaning of the apparatus. The charging of the apparatus with fuel takes place through an opening 18 in the cover, the opening being hermetically closed by a lid 19 fitted with a locking device 20. The different parts of the apparatus are preferably connected by welding, since rivets and screws are not sufficiently reliable for a gas producer used on a motor vehicle.

For starting the gas producer, the latter is filled up to about the level of the nozzles 14 with charcoal and further up with bits of wood or other solid gasifiable substances. Then the fuel contained in the conduit 10 is kindled through the aperture 16, and an engine not shown, which is connected to the pipe 11, is started so that air will be sucked through the inlets 15 and through the ring 13 and nozzles 14 into the conduit 10 wherein, in a very short time (2 minutes or less) gas will be produced for supplying power to the engine. It is of the greatest importance that the hot gasification zone should, as shown in the drawings, extend beyond the conduit 10 in order to provide a free passage for the outgoing gas. In this manner a clogging up of the producer, which is so common particularly in producers fitted with grates, is completely obviated. The ashes are able to distribute themselves within the producer and rise through the outer space without detrimentally affecting the working of the producer. Since very little ashes are produced in this process of gasification, the apparatus will be able to carry on for a considerable time without trouble.

While the generated gas rises upwards through the annular space 5, the atmospheric air for the gasification passes downwards through the outer space 6. In this manner fuel and air will be effectively preheated while the producer is externally thermally insulated.

It is evident that the producer may be worked on the lines of upward instead of downward combustion, and that it may, within the scope of the invention, be used as a stationary plant instead of as a gas producer for motor vehicles.

I claim:

A gas producer having in combination, a producer gas generating chamber having an upper portion to which fuel is admitted and a lower portion from which the generated gas is drawn off, an outer air admission jacket, an inner gas outlet jacket surrounding the upper fuel portion, said jackets having sheet metal walls, the inner wall of the gas outlet jacket forming the wall of the upper fuel portion, said inner wall having a frusto-conical section and a bottom neck section attached to and below the frusto-conical portion, an annular pipe surrounding the neck section and connected to the air jacket, radial pipes extending into the fuel bed and connected to the annular pipe for conducting air thereto, and a producer gas outlet pipe connected to the upper portion of the gas outlet jacket.

GEORGES IMBERT.